Aug. 26, 1958 W. H. NEELY 2,849,057
WIRE SPRING MEMBERS AND STRUCTURES
Filed Aug. 9, 1954 9 Sheets-Sheet 2

INVENTOR.
WILLIAM H. NEELY
BY
*Gustav A. Wolff*
ATT.

Aug. 26, 1958 W. H. NEELY 2,849,057
WIRE SPRING MEMBERS AND STRUCTURES
Filed Aug. 9, 1954 9 Sheets-Sheet 3

INVENTOR.
WILLIAM H. NEELY
BY
ATT.

Aug. 26, 1958 — W. H. NEELY — 2,849,057
WIRE SPRING MEMBERS AND STRUCTURES
Filed Aug. 9, 1954 — 9 Sheets-Sheet 5

INVENTOR.
WILLIAM H. NEELY
BY
ATT.

Aug. 26, 1958 W. H. NEELY 2,849,057
WIRE SPRING MEMBERS AND STRUCTURES
Filed Aug. 9, 1954 9 Sheets-Sheet 6

INVENTOR.
WILLIAM H. NEELY

Aug. 26, 1958 W. H. NEELY 2,849,057
WIRE SPRING MEMBERS AND STRUCTURES
Filed Aug. 9, 1954 9 Sheets-Sheet 7

INVENTOR,
WILLIAM H. NEELY
BY
ATT.

Aug. 26, 1958

W. H. NEELY

2,849,057

WIRE SPRING MEMBERS AND STRUCTURES

Filed Aug. 9, 1954

INVENTOR.
WILLIAM H. NEELY
BY
ATT.

United States Patent Office 2,849,057
Patented Aug. 26, 1958

2,849,057

WIRE SPRING MEMBERS AND STRUCTURES

William H. Neely, Cleveland, Ohio, assignor to The Universal Wire Spring Company, Bedford, Ohio, a corporation of Ohio Application August 9, 1954, Serial No. 448,551

11 Claims. (Cl. 155—179)

This invention relates to improvements in wire spring structures used in seat and back spring constructions for automobiles, davenports, chairs and the like, and has particular reference to improvements in wire spring structures of the type having elongated zigzag seating or resting portions and accordion-fold zigzag means supporting said seating or resting portions.

In present-day spring structures of the type to which reference has been made, the seating or resting portion generally comprises a sinuously corrugated or zigzag shaped spring strip which is mounted on accordion-fold zigzag supporting elements engaged with the bottom of the resting portions in two or three separate areas. These supporting elements are disposed either at or near the end areas of the resting portion, or, when the resting portion requires additional support, a central or intermediate supporting element is added. Such additional central or intermediate supports, when used on seat backs, require frame supporting elements which are not only expensive but tend to fill up the space otherwise available for use as knee room for passengers in the rear seating compartment of motor vehicles.

Prior art spring structures generally employ accordion-fold supporting elements which are manufactured by twisting certain cross members of zigzag spring strips. This twisting of the cross members of zigzag spring strips causes the winding up of the fibers thereof, and, extreme twisting of the cross members creates therein unwinding forces which, due to certain limitations in manufacturing methods presently employed, limits the minimum angle obtainable between portions of the wire spring structures adjacent the twisted cross members even when the spring structures are formed and stress-relieved in fully compressed condition.

The arm of the accordion-fold shaped zigzag supporting elements onto which the zigzag resting portion of the prior art spring structure is seated and secured is axially extensible and contractible in substantially the same degree as the resting portion, and therefore merely provides reinforcement for localized areas of the resting portion.

With the foregoing in view, the primary object of the invention is the provision of a spring structure of the type referred to above in which the zigzag resting portion is supported at spaced transverse members at or near each end thereof by relatively non-extensible supporting arms of accordion-fold supporting members.

Another object of the invention is to provide a spring structure of the class described having zigzag resting strips and accordion-fold supporting elements at or near the ends thereof, each accordion-fold supporting element including a relatively non-extensible supporting arm disposed below said zigzag resting strips with cross members extending therefrom to which spaced transverse members of the zigzag resting strips are secured and onto which the said resting strips are seated.

Another object of the invention is to provide a spring structure including a frame, elongated zigzag resting elements spaced from said frame, and accordion-fold elements composed of substantially straight lever arms and cross members rigidly connected at one end in cantilever relationship to said frame supporting said zigzag resting elements substantially at and in spaced relationship to each end thereof, each of said accordion-fold supporting elements terminating in a resting element supporting arm provided at its ends with cross members arranged to coincide with and be secured to spaced transverse members of the zigzag resting element supported thereby.

Another object of the invention is the provision of a spring structure of the type described above wherein the resting element supporting arm of each accordion-fold supporting element is bent sufficiently to permit the flexing of that portion of the zigzag resting element located opposite said resting element supporting arm whereby to insure substantially free flexing action of the zigzag resting element under applied load conditions.

Another object of the invention is the provision of a spring structure of the type described above wherein the resting element supporting arms of the accordion-fold supporting elements extend a substantial distance into the spring structure under the zigzag resting elements from the ends thereof by giving the resting element supporting arms the necessary length whereby said supporting arms reach inwardly under the zigzag resting element to support the same at at least four substantially spaced transverse members thereof.

Another object of the present invention is the provision of a new type of wire spring structure which includes accordion-fold shaped wire supporting means formed from straight wire by mere bending operations to avoid winding up of the fibers in any of the members of the accordion-fold shaped wire supporting means whereby to provide wire spring structures of any desired shape and height having no torsional deformation therein. This general object of the invention is attained by forming the accordion-fold shaped supporting members from straight wire bent in predetermined spaced areas to include a plurality of short substantially parallel cross members and a plurality of substantially straight, relatively long arms connecting the parallel cross members sequentially in spaced relationship to each other.

Another object of the invention is the provision of a new type of wire spring structure including an accordion-fold shaped wire supporting means which includes a plurality of short, parallel cross members spaced a substantial distance from each other and a plurality of substantially straight, relatively long arms connecting the cross members sequentially to each other and arranged in spaced inclined relation with respect to each other.

Another object of the invention is to provide a spring structure of the class described including a frame and resting members resiliently supported in spaced relationship thereto at spaced points on torsionally resistant accordion-fold supporting members cantilevered from said frame at spaced intervals leaving a large usable recessed space at the rear of said spring structure between said accordion-fold supporting members.

A further object of the invention is to provide a seat back spring structure having a maximum of recessed area at the rear thereof to provide all possible knee room at the back of the front seat of a motor vehicle, and at the same time, to assure seat and back resting comfort for the vehicle driver and front seat passenger.

Still another object of the invention is the provision of a wire spring structure with an accordion-fold shaped wire spring element formed by two symmetrically fashioned and arranged accordion-fold shaped wire supporting means for the seating portion of the spring structure which include converging arms having their ends connected to each other and formed to provide the accordion-fold wire spring element with attachment means adapted to secure such element to a frame and extend therefrom in cantilever-like relationship with respect thereto.

In addition, the invention has certain other marked superiorities which radically distinguish it from presently known structures. These improvements or superior characteristics embodying certain novel features of construction which are clearly set forth in the following specification and the appended claims; several illustrative preferred embodiments of the invention as applied to seat back structures being hereinafter described in detail and shown in the accompanying drawings which form a part of the specification.

Although the illustrative embodiments of the invention have been disclosed and described herein in connection with seat back construction for vehicles and the like, it is obvious that the invention disclosed in the specification and defined by the appended claims is applicable to seat structures as well as seat back constructions.

In the drawings:

Fig. 23 is a side view of Fig. 22.

Figs. 56 through 59 are diagrammatical side views of a seat back construction including double N-shaped wire spring members such as disclosed in Fig. 1; thus

Figs. 60 through 63 are diagrammatical side views of a seat back construction including M-shaped wire spring members of the type disclosed in Fig. 31; thus

In the exemplified forms of the invention shown in the drawings, the figures cover different seat back structures, each embodying a frame with attachment means and a plurality of complex wire spring structures mounted on such frame crosswise thereof to provide a seat back structure embodying a spring construction adapted to be upholstered as customary. Complex wire spring structures are assembled from elongated zigzag wire strips and accordion-fold wire supporting members of a shape similar to the shape of the N-shaped, double N-shaped, M-shaped, and double M-shaped accordion-fold wire supporting members shown in the drawings.

Referring now in detail to these drawings, the seat back structure 2, illustrated in Figs. 1 through 4 inclusive, embodies a substantially rectangularly shaped open frame 3 having a top rail 4, a bottom rail 5 and side posts 6 which form the side rails of the frame and have attached thereto, preferably by welding, the top and bottom rails 4 and 5. The thus constructed frame, which embodies on its top and bottom rails socket arrangements 7 including upwardly extended hook-shaped integral extensions 8 of such rails, mounts crosswise thereof a plurality of complex wire spring structures 9 which are secured to said frame by extensions 8.

Figures 1, 2, 3, 4:
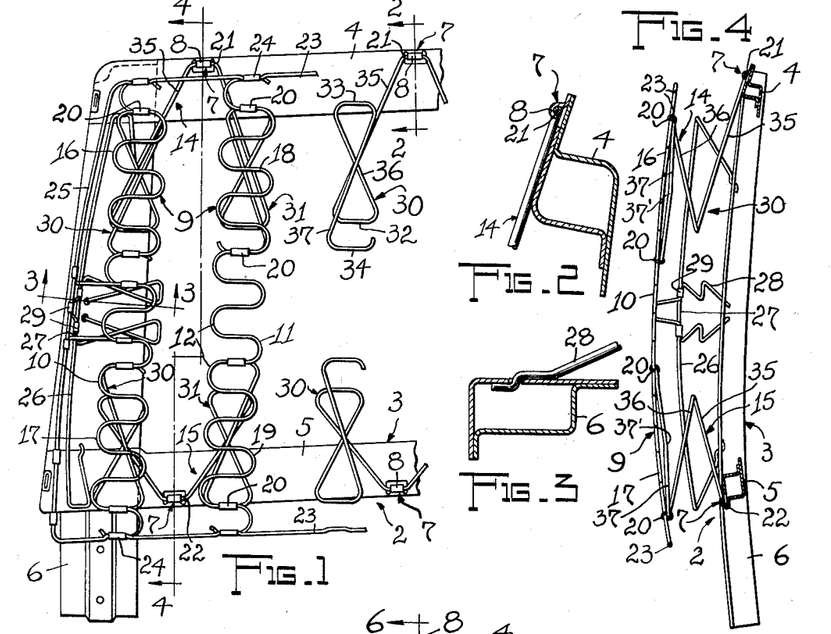
Fig. 1 is a view in elevation of the left-handed portion of a seat back, with parts broken away, embodying features of the present invention.
Fig. 2 is an enlarged fragmentary sectional view of the structure illustrated in Fig. 1 taken on line 2—2 thereof.
Fig. 3 is an enlarged fragmentary sectional view of the structure illustrated in Fig. 1 taken on line 3—3 thereof.
Fig. 4 is a sectional view of the structure illustrated in Fig. 1 taken on line 4—4 thereof.

Each complex wire spring structure 9 is assembled from two parallelly arranged elongated zigzag wire strips 10 and 11, which are made of steel wire bent to extend their loops 12 substantially parallel to each other, and two oppositely arranged double N-shaped accordion-fold wire supporting members 14 and 15 of specific construction, as will be later described, which supporting members engage the outer end portions 16, 17 and 18, 19 of zigzag wire strips 10 and 11, are secured thereto by clips 20 and are coupled with frame 3 by cross member 21, 22 attached to hook-shaped extensions 8 on the top and bottom rails 4 and 5 of said frame (see Fig. 2). Complex wire spring structures 9 are encircled, as customary, by a border wire 23 coupled by clips 24 with the opposite ends of wire strips 10 and 11. This border wire includes side portions 25 supported by formed wires 26 mounted on side posts 6, which formed wires have their middle portions 27 yieldingly supported by V-shaped spring brackets 28 mounted on side posts 6 (see Fig. 3) and coupled with said formed wires and side portions 28 by clips 29.

The two double N-shaped accordion-fold wire supporting members 14 and 15, which are attached to the bottom face of crowned elongated zigzag wire strips 10 and 11, are bent to their shape from straight wire and include two symmetrically arranged N-shaped sections 30, 31, each of which embodies three parallelly arranged short wire cross members 32, 33 and 34 connected in series by substantially straight elongated wire levers 35, 36 and 37. These straight wire levers are inclined with respect to each other and the lower straight wire levers 35 of the two sections 30 and 31 converge toward each other and blend into the respective short wire cross members 21, 22, respectively. These latter wire cross members are extended parallel to wire cross members 32, 33 and 34 and permit attaching of double N-shaped accordion-fold wire supporting members 14, 15 to hook-shaped extensions 8 on frame 3 to extend these members in cantilever-like fashion from said frame. Upper straight wire levers 37 form relatively non-extensible and contractible supporting arms for the double N-shaped sections 30 and 31 and are bent at 37' to curve away from the bottom face of the respective zigzag wire strips attached thereto, and wire levers 35, 36 and 37 are arranged to cross each other by connecting same to diagonally opposed ends of the respective short wire cross members 32, 33 and 34.

Figures 5, 7:
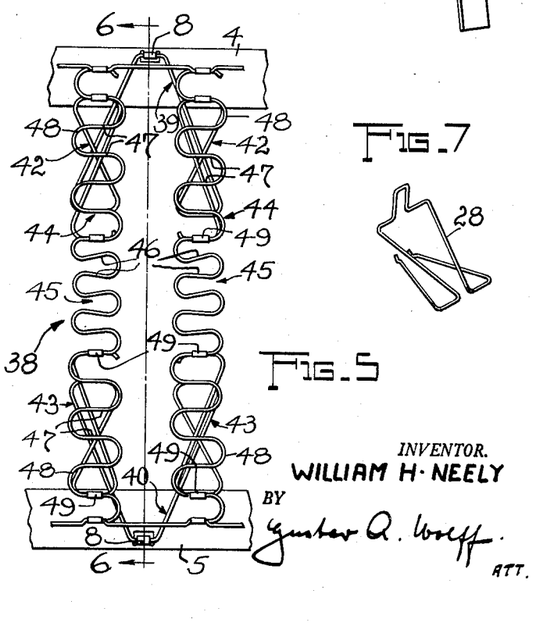
Fig. 5 is a fragmentary view in elevation of a somewhat modified form of a seat back embodying features of the present invention.
Fig. 7 is a perspective view of a side edge wire supporting element of the structure illustrated in Fig. 1.
Figure 6:
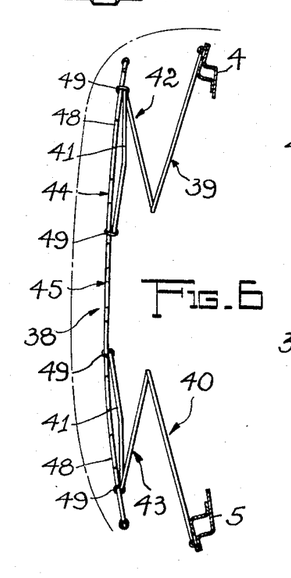
Fig. 6 is a sectional view of the structure illustrated in Fig. 5 taken on line 6—6 thereof.
Figure 8:
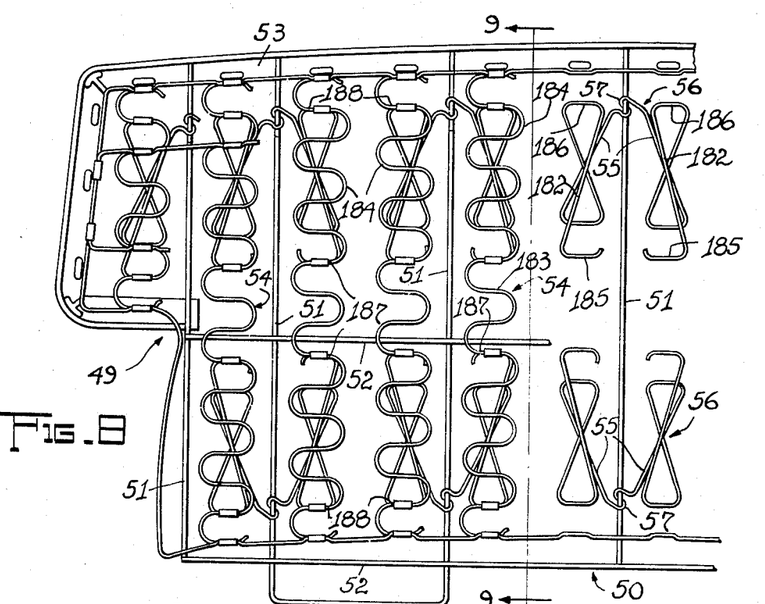
Fig. 8 is a view in elevation of the left-handed portion of another somewhat modified form of a seat back, with parts broken away, embodying features of the present invention.

In the modified form of the invention shown in Figs. 5 and 6, the complex wire spring structure 38 includes two double N-shaped accordion-fold wire supporting members 39 and 40 which are identical in construction to supporting members 14 and 15 previously described and similarly attached to extensions 8 of upper and lower rails 4 and 5. Accordion-fold wire supporting members 39 and 40 mount on each of their upper slightly bent supporting arms 41 of their sections 42, 43 a zigzag wire strip 44 which includes in its central area a portion 45 in which the loop-connecting wire cross members 46 are spaced closer to each other than the loop-connecting wire cross members 47 of the end portions 48 of zigzag wire strip 44. The specific form of the thus constructed zigzag wire strips 44 which are connected to supporting arms 41 by clips 49 increases the resiliency of the middle portions 45 of these strips and therewith the resiliency of the complex wire structure 39.

The modified form of the invention shown in Figs. 8 through 12 shows a seat back structure 49 which embodies a wire base frame 50 having a plurality of parallel wire stringers 51 connected to each other by a plurality of elongated substantially parallel wire connecting members 52 extended crosswise of such wire stringers and welded thereto. Wire base frame 50 has attached to the upper ends of wire stringers 51 a trim rim 53 and supports a plurality of complex wire spring structures 54 extended parallel to wire stringers 51 and coupled with and supported thereby. Complex wire spring structures 54 are constructed similar to complex wire spring structures 9 previously described, with the exception that the lower converging wire levers 55 of their double N-shaped accordion-fold wire supporting members 56 blend into an S-shaped configuration 57 which connects the lower wire levers 55 with each other and includes two symmetrically arranged loops 58, 59 connected with three parallelly arranged straight wire cross members 60, 61, 62. S-shaped configuration 57 cooperates with a sharply curved, outwardly extended open loop 63 in a wire stringer 51 and removably mounts complex wire spring structure 54 on the wire base frame 50 when the wire cross member 61 of S-shaped configuration 57 extends through the open loop 63 of wire stringer 51 and wire cross members 60, 62 extend adjacent the open loop 63 of wire stringer 51.

Accordion-fold wire supporting member 56 is constructed to extend its supporting arms 182 in a plane substantially parallel to the plane of lower converging wire levers 55 and this parallel relation of these planes is changed to angular relation when complex wire spring structures 54 are mounted on wire stringers 51 of wire base frame 50. This change of angular relation of the two planes causes pre-loading of supporting arms 182 and increases the load resistance of inner areas 183 of zigzag wire strips 184 of the complex wire spring structures 54, as these inner areas are supported by end cross members 185 of supporting arms 182 arranged to reach inwardly under zigzag wire strips 184 toward their middle portion and are connected by their outer and inner end cross members 185, 186 with respective cross members 187 of zigzag wire strips 184.

Figures 9, 10, 11, 12:
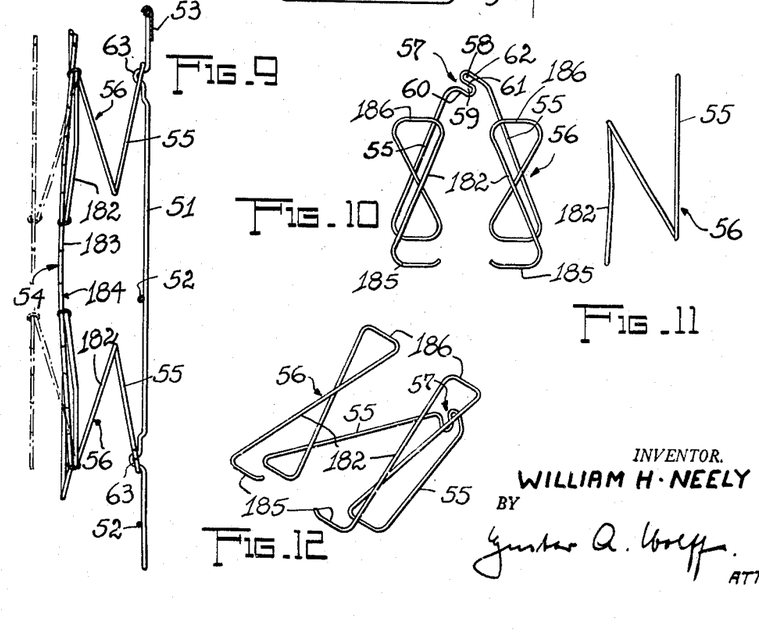
Fig. 9 is a sectional view of the structure illustrated in Fig. 8 taken on line 9—9 thereof.
Fig. 10 is a plan view of one of the double N-shaped wire strip supporting wire spring members which together with wire strips form the complex spring structures of the seat back shown in Figs. 8 and 9.
Fig. 11 is a side view of Fig. 10.
Fig. 12 is a perspective view of the wire spring member shown in Figs. 10 and 11.

Instead of mounting assembled complex wire spring structures 54, assembly of seat back structure 49 may be effected by first mounting the accordion-fold wire supporting members 56 on wire stringers 51, then seating zigzag wire strips 184 on members 56 and attaching respective cross members 187 of said wire strips to outer end cross members 185 of supporting arms 182 and, finally, attaching other cross members 188 of the wire strips to inner cross members 186 of supporting arms 182 as shown in dash-dotted lines in Fig. 9 clearly indicating the change in the angular relation between two planes previously referred to.

The modified forms of accordion-fold wire supporting members shown in Figs. 13 through 33 include M-shaped wire sections similar in construction and action to the N-shaped wire spring supporting members 14, 15 previously described, that is, all modified forms embody three parallelly arranged short wire cross members connected in series by substantially straight, non-extensible and non-contractible elongated wire levers.

Figure 13:
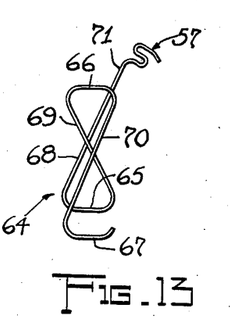
Fig. 13 is a plan view of a single N-shaped wire strip supporting wire spring member.
Figure 14:
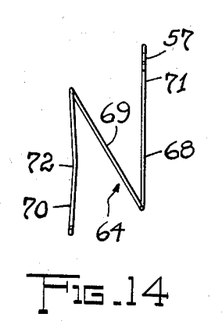
Fig. 14 is a side view of Fig. 13.
Figure 15:
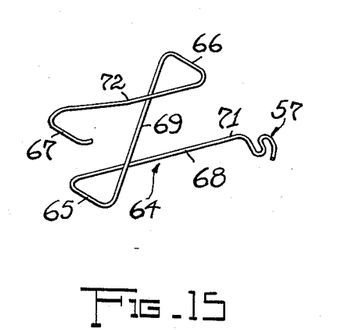
Fig. 15 is a perspective view of the wire spring member shown in Figs. 13 and 14.

Accordion-fold wire supporting member 64 shown in Figs. 13 through 15 embodies only a single N-shaped section having three short wire cross members 65, 66, 67 connected at their diagonally opposed ends in series to substantially straight elongated wire levers 68, 69 and 70. Lower wire lever 68 includes a free end portion 71 which is bent to form an S-shaped attachment configuration 57 of the type previously described and supporting arm 70 is bent between its ends at 72 to prevent contact of its middle portion with a zigzag wire strip supported thereby.

Figure 16:
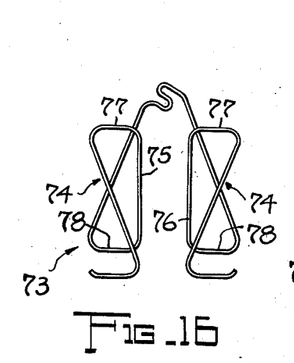
Fig. 16 is a plan view of a modified form of a double N-shaped wire strip supporting wire spring member.
Figure 17:
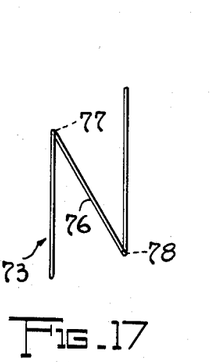
Fig. 17 is a side view of Fig. 16.
Figure 18:
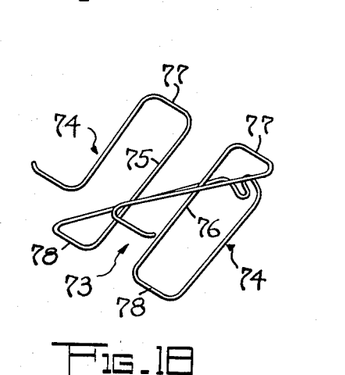
Fig. 18 is a perspective view of the wire spring member shown in Figs. 16 and 17.

Accordion-fold supporting member 73 shown in Figs. 16 through 18 embodies two symmetrically arranged N-shaped sections 74 and is constructed substantially similar to the N-shaped sections of accordion-fold wire supporting members 56 shown in Figs. 8 through 12, with the exception that intermediate levers 75, 76 of the two N-shaped sections 74 are arranged in planes parallel to each other to connect the directly opposed ends of short wire cross members 77, 78.

Figure 19:
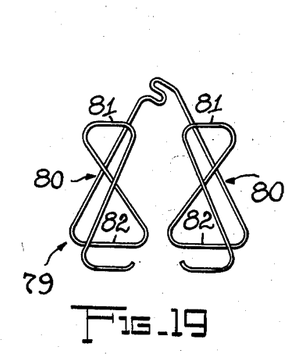
Fig. 19 is a plan view of another modified form of a double N-shaped wire strip supporting wire spring member.
Figures 20, 21:
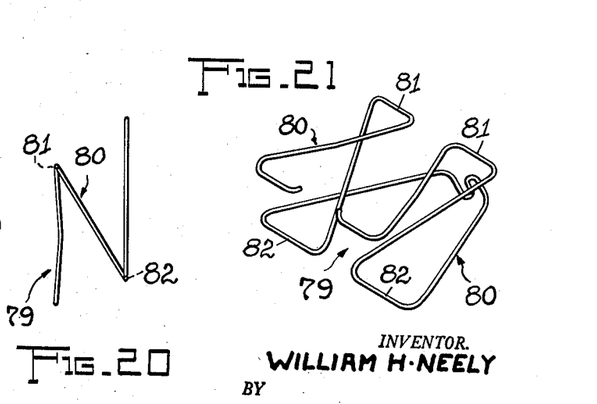
Fig. 20 is a side view of Fig. 19.
Fig. 21 is a perspective view of the wire spring member shown in Figs. 19 and 20.

Accordion-fold wire supporting member 79 shown in Figs. 19 through 21 includes symmetrically arranged N-shaped sections 80 constructed substantially similar to the N-shaped sections of accordion-fold wire supporting members 56 (see Figs. 8 through 12), with the exception that the length of short wire cross members 81 of N-shaped sections 80 differentiates from the length of the short wire cross members 82 of these sections. Differentiation in the length of short wire cross members 81, 82 of N-shaped sections 80 of the accordion-fold wire supporting member 79 controls the yielding action and yielding resistance of member 79 and affords a simple and practical means to simplify control of the yielding action and yielding load-resistance of the accordion-fold wire supporting member.

Figure 22:
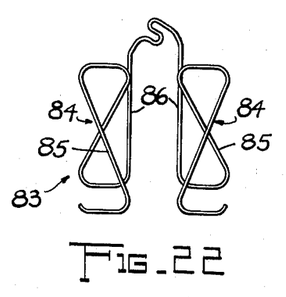
Fig. 22 is a plan view of a further modified form of a double N-shaped wire strip supporting wire spring member.
Figure 24:
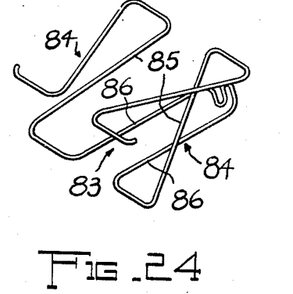
Fig. 24 is a perspective view of the wire spring member shown in Figs. 22 and 23.

Accordion-fold wire supporting member 83 shown in Figs. 22 through 24 has its symmetrically arranged N-shaped sections 84 constructed substantially similar to the N-shaped sections 74 of accordion-fold wire supporting member 73, with the exception that instead of intermediate levers 85 the lower levers 86 of N-shaped sections 84 are arranged parallel to each other.

Figures 25, 26:
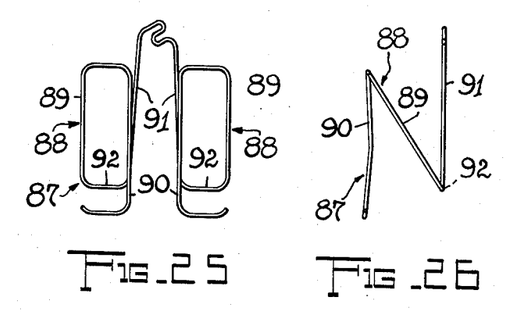
Fig. 25 is a plan view of still another modified form of a double N-shaped wire strip supporting wire spring member.
Fig. 26 is a side view of Fig. 25.
Figure 27:
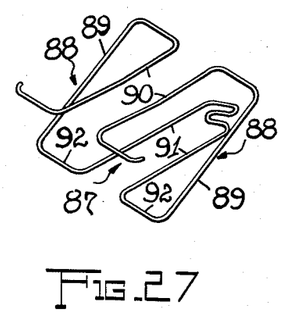
Fig. 27 is a perspective view of the wire spring member shown in Figs. 25 and 26.

Accordion-fold wire supporting member 87 shown in Figs. 25 through 27 has its symmetrically arranged N-shaped sections 88 constructed substantially similar to the N-shaped sections 84 of accordion-fold wire supporting member 83 shown in Figs. 22 through 24, with the exception that the middle and top levers 89 and 90 of N-shaped sections 88 are arranged in substantially parallel planes. In this case, N-shaped sections 88 are formed to extend their lower levers 91 from the opposed inner ends of cross members 92.

Figure 28:
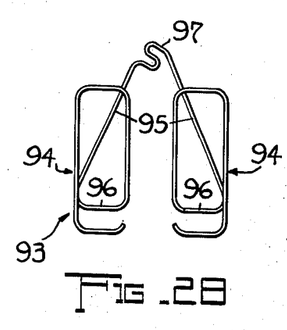
Fig. 28 is a plan view of a still further modified form of a double N-shaped wire strip supporting wire spring member.
Figure 29:
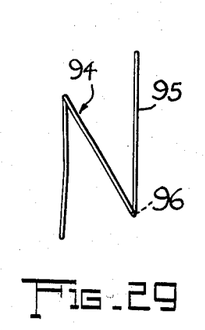
Fig. 29 is a side view of Fig. 28.
Figure 30:
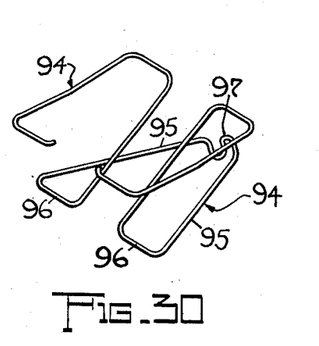
Fig. 30 is a perspective view of the wire spring member shown in Figs. 28 and 29.

Accordion-fold wire supporting member 93 shown in Figs. 28 through 30 has its symmetrically arranged N-shaped sections 94 constructed substantially similar to the N-shaped sections 88 of accordion-fold wire supporting member 87 shown in Figs. 25 through 27, with the exception that N-shaped sections 94 are formed by bending a wire in a direction opposite to the bends in N-shaped sections 88. By this arrangement the lower levers 95 of N-shaped sections 94 are extended from the outer ends of cross members 96 and converge at a substantial angle into an S-shaped attachment configuration 97.

Figures 31, 32:
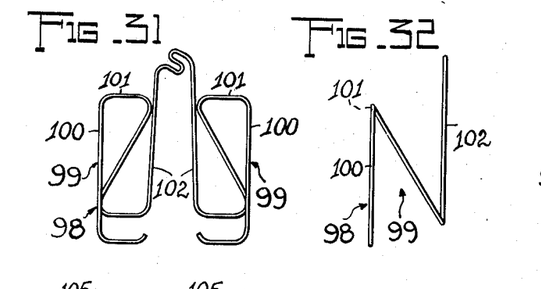
Fig. 31 is a plan view of still another modified form of a double N-shaped wire strip supporting wire spring member.
Fig. 32 is a side view of Fig. 31.
Figure 33:
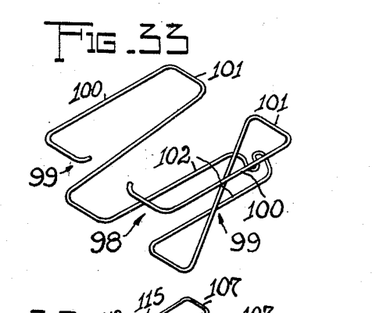
Fig. 33 is a perspective view of the wire spring member shown in Figs. 31 and 32.

Finally, accordion-fold wire supporting member 98 shown in Figs. 31 through 33 has is symmetrically arranged N-shaped sections 99 constructed substantially similar to the N-shaped sections 84 of accordion-fold wire supporting member 83 shown in Figs. 22 through 24, with the exception that the supporting arms 100 of N-shaped sections 99 are extended from the outer ends of short wire cross members 101 in vertical planes substantially parallel to the lower levers 102 of the N-shaped sections 99.

Figures 34, 35, 36:
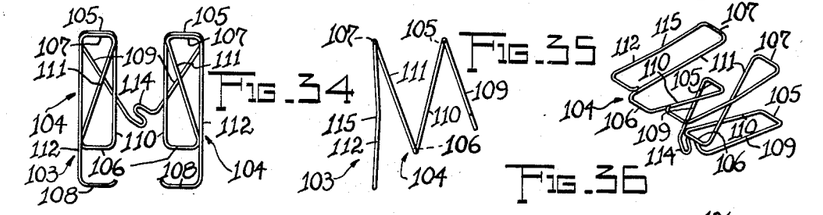
Fig. 34 is a plan view of a double M-shaped wire strip supporting wire spring member.
Fig. 35 is a side view of Figs. 34.
Fig. 36 is a perspective view of the wire spring member shown in Figs. 34 and 35.

Accordion-fold wire supporting members of the general type heretofore described may be formed with M-shaped sections as shown in Figs. 34 through 50. Thus, accordion-fold wire supporting member 103 shown in Figs. 34 through 36 includes two symmetrically arranged M-shaped sections 104 which each embody four parallelly arranged short wire cross members 105, 106, 107, 108 sequentially connected by substantially straight elongated wire levers 109, 110, 111, 112. These latter wire levers are inclined with respect to each other and the lower levers 109 thereof converge toward each other and blend into an S-shaped configuration 114 which connects these lower wire levers to each other. S-shaped configuration 114, as previously described, permits attaching of the accordion-fold wire supporting member 103 to a wire frame and extending therefrom in a cantilever-like fashion. The supporting arms or upper levers 112 of M-shaped sections 104 are bent at 115 to permit their curving away from zigzag wire strips supported by such arms, as will be later described.

Figures 37, 38:
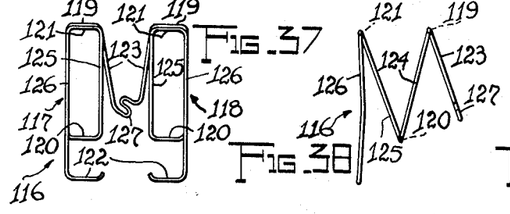
Fig. 37 is a plan view of a modified form of a double M-shaped wire strip supporting wire spring member.
Fig. 38 is a side view of Fig. 37.
Figure 39:
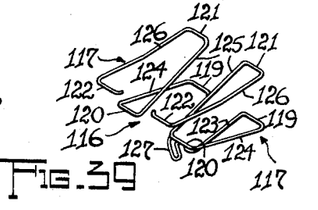
Fig. 39 is a perspective view of the wire spring member shown in Figs. 37 and 38.

Accordion-fold wire supporting member 116 shown in Figs. 37 through 39 embody symmetrically arranged M-shaped sections 117, 118 in the form of right-handed and left-handed elongated coil-like springs of substantially rectangular cross section. The M-shaped sections 117, 118 each embody four parallelly arranged short cross members 119, 120, 121, 122 connected in series by substantially straight elongated wire levers 123, 124, 125, 126 which extend in parallel planes and are inclined with respect to each other, and the lower straight wire levers 123 converge toward each other and blend into an S-shaped configuration 127.

Figures 40, 41, 42, 43, 44, 45:
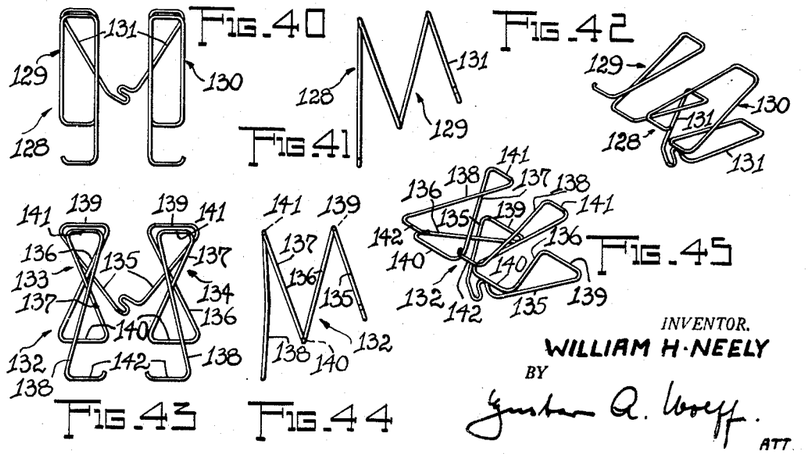
Fig. 40 is a plan view of another modified form of a double M-shaped wire strip supporting wire spring member.
Fig. 41 is a side view of Fig. 40.
Fig. 42 is a perspective view of the wire spring member shown in Figs. 40 and 41.
Fig. 43 is a plan view of still another modified form of a double M-shaped wire strip supporting wire member.
Fig. 44 is a side view of Fig. 43.
Fig. 45 is a perspective view of the wire spring member shown in Figs. 43 and 44.

Accordion-fold wire supporting member 128 shown in Figs. 40 through 42 includes symmetrically arranged M-shaped sections 129, 130 constructed substantially similar to the M-shaped sections 117, 118 of accordion-fold wire supporting member 116 shown in Figs. 37 through 39, with the exception that M-shaped sections 129, 130 form left-handed and right-handed elongated coil-like springs of substantially rectangular cross section and that the lower straight wire levers 131 converge at a substantial angle.

Finally, accordion-fold wire supporting member 132 shown in Figs. 43 through 45 has its symmetrically arranged M-shaped sections 133, 134 formed so that the elongated straight wire levers 135, 136, 137, 138 of the respective sections cross each other by connecting respective wire levers to diagonally opposed ends of the respective short wire cross members 139, 140, 141, 142. In addition, the short wire cross members of M-shaped sections 133, 134 differentiate in length and the straight wire levers of these sections also differentiate in length to permit proper control of action and reaction of accordion-fold wire supporting member 132 under all load conditions.

Figure 46:
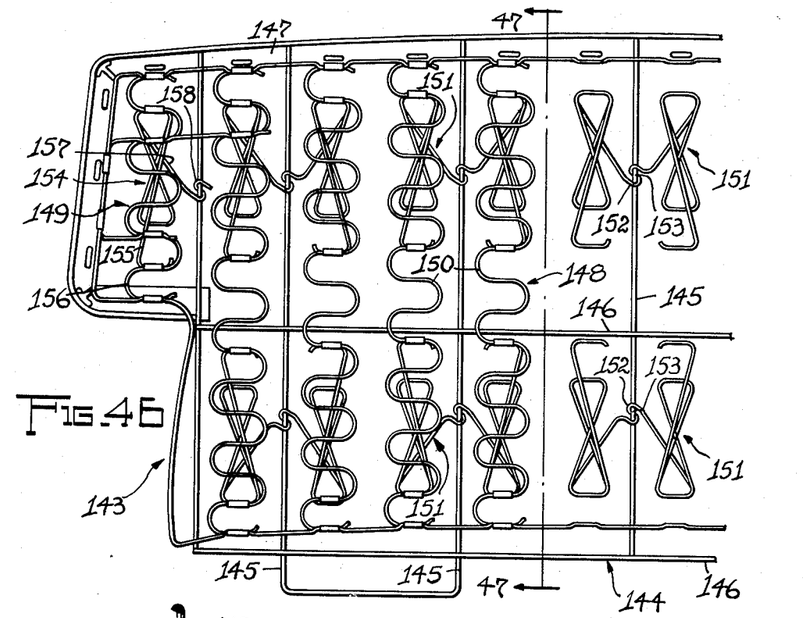
Fig. 46 is a view in elevation of the left-handed portion of a further somewhat modified form of a seat back, with parts broken away, embodying features of the present invention.
Figures 47, 48, 50:
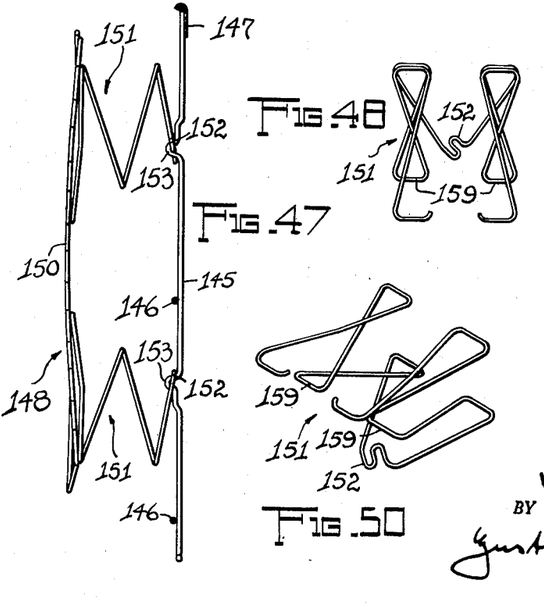
Fig. 47 is a sectional view of the structure illustrated in Fig. 46 taken on line 47—47 thereof.
Fig. 48 is a plan view of a double M-shaped wire strip supporting wire spring member which together with wire strips forms the combined spring structure of the seat back shown in Figs. 46 and 47.
Fig. 50 is a perspective view of the wire spring member shown in Figs. 48 and 49.
Figure 49:
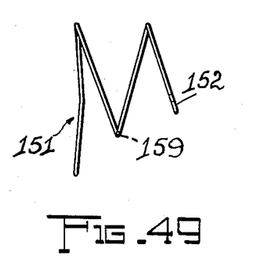
Fig. 49 is a side view of Fig. 48.
Figure 51:
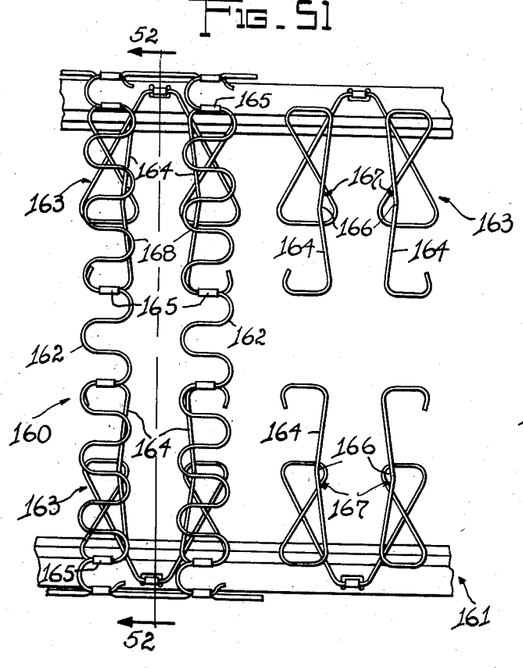
Fig. 51 is a view in elevation of still another modified form of a seat back, with parts broken away, embodying features of the present invention.
Figure 52:
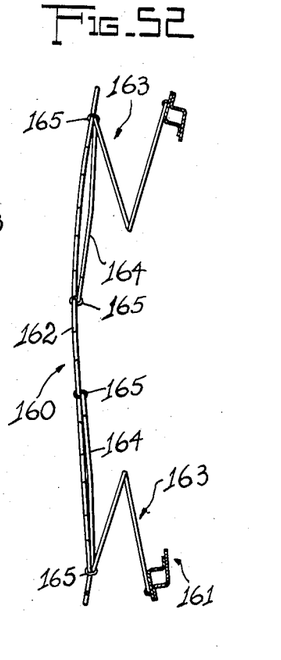
Fig. 52 is a sectional view of the structure illustrated in Fig. 51 taken on line 52—52 thereof.

Wire supporting members of the type described in Figs. 34 through 45 may be combined with elongated zigzag wire strips to complex wire spring structures adapted to be used for seat back structures when such complex wire spring structures are mounted on frames as illustrated in Figs. 46 and 47. In these figures seat back structure 143 embodies a wire base frame 144 which includes a plurality of wire stringers 145 arranged in parallel, spaced relation with respect to each other and shaped to serve their particular purpose. Wire stringers 145 are connected to each other by a plurality of elongated substantially parallel wire connecting members 146 which extend crosswise of the wire stringers and are welded thereto. The thus constructed wire base frame 144 has attached to the upper ends of its wire stringers 146 a trim rim 147 and supports a plurality of complex wire spring structures 148, 149 which extend parallel to wire stringers 145, are coupled therewith and supported thereby.

The complex wire structures 148 each are assembled from two parallelly arranged elongated zigzag wire strips 150 and two oppositely arranged double M-shaped accordion-fold wire supporting members 151 constructed substantially similar to the accordion-fold wire supporting member 132 previously described (see Figs. 43 through 45). Accordion-fold wire supporting members 151 are attached to the bottom face of zigzag wire strips 150 and have their S-shaped supporting configurations 152 coupled with sharply curved, outwardly extended open loops 153 in wire stringers 145 to removably mount the complex wire structures 148 on wire base frame 144.

The complex wire spring structure 149 embodies a single M-shaped accordion-fold wire supporting member 154 which has its supporting arm or upper lever 155 attached to the bottom face of a zigzag wire strip 156 shorter in length than the wire strips 150 and includes at the end of its lower lever 157 an S-shaped configuration 158 for coupling the complex wire spring structure 149 to wire stringer 145 of wire base frame 144. The specific shape of double M-shaped accordion-fold wire supporting members 151 (see Figs. 48 through 50) differentiates from wire supporting member 132 only in the length of short wire cross members 159.

Possible displacement and interengagement of the supporting arms of N-shaped and M-shaped accordion-fold wire supporting members when assembled with elongated zigzag wire strips to complex wire spring structures is avoided by bending these supporting arms laterally. Thus, see Figs. 51 through 54, complex wire spring structure 160 of seat back structure 161, which includes two sinuously corrugated wire strips 162 and two double N-shaped accordion-fold wire supporting members 163 engaging with their supporting arms 164 the bottom surfaces of zigzag wire strips 162 and attached thereto by clips 165, have supporting arms 164 bent to curve downwardly away from the bottom surfaces of zigzag wire strips 162 and bent laterally as indicated at 166 to extend the central portions 167 of supporting arms 164 in a direction toward the longitudinal axis of the respective zigzag wire strips 162 to position these supporting arms 164 directly below the zigzag wire strips and avoid entanglements of loops 168 of zigzag wire strips 162 with the supporting arms 164.

Figure 53:
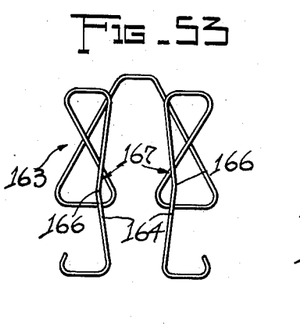
Fig. 53 is a plan view of one of the double N-shaped wire strip supporting wire spring members which together with wire strips form the complex spring structures of the seat back shown in Figs. 51 and 52.
Figure 54:
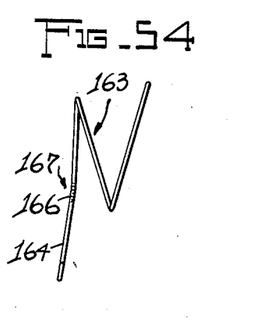
Fig. 54 is a side view of Fig. 53.
Figure 55:
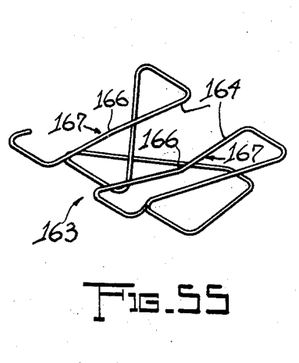
Fig. 55 is a perspective view of the wire spring member shown in Figs. 53 and 54.

The specific shape of double N-shaped wire supporting members 163 is shown in Figs. 53 through 55, in which the supporting arms 164 are shown bent at 166 in their central portions 167.

The wire spring structures described which are assembled from complex spring structures embodying zigzag wire strips and accordion-fold wire supporting members permit substantial flexibility in their construction and action by forming the zigzag wire strips and the accordion-fold wire supporting members of these structures from differently gaged wire and can readily be adapted to all requirements by selectively dimensioning their lever arms and cross members and pre-selecting the angular relation of the lever arms with respect to each other to impart to the resting surface the desired resistance in the areas of support and attachment to effect the required balance of forces counteracting all load and shock conditions. This flexibility permits structures of this type to be designed to absorb loading in a minimum space, as the arms of the accordion-fold elements can be arranged to lay adjacent each other and hug the resting portions of the structures under shock loads, thus providing additional available space within a given area assigned to seating, as will best be understood from inspection of Figs. 56 through 63 showing diagrammatically a front seat back construction 169 and a rear seat back construction 177.

Figures 56, 57:
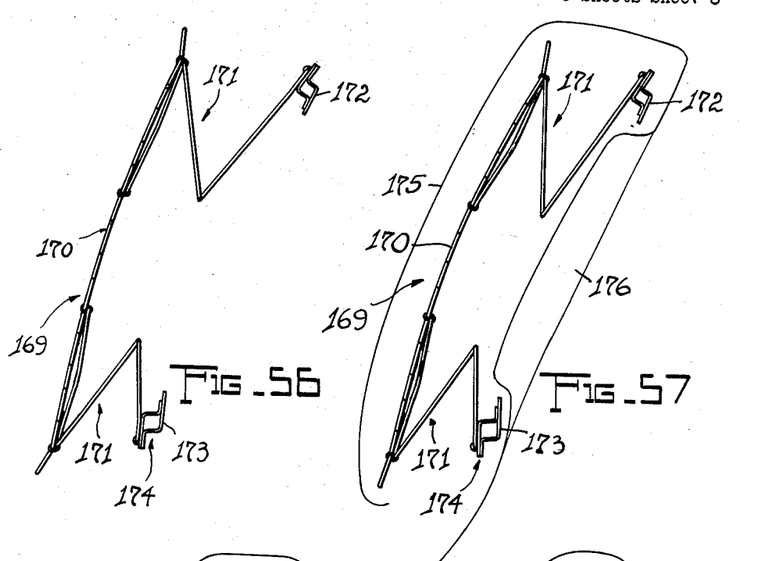
Fig. 56 shows the shape of complex wire spring structures mounted on a frame.
Fig. 57 shows the shape of upholstered and partly tensioned complex wire spring structures.
Figure 58:
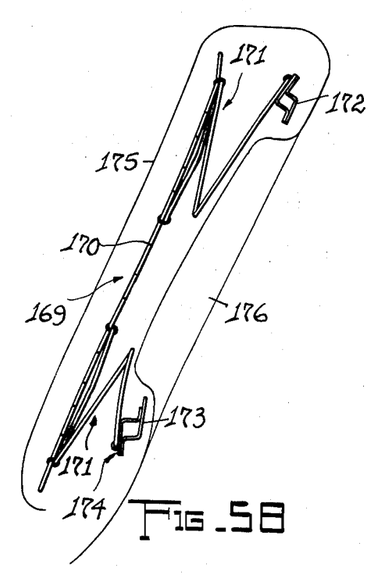
Fig. 58 shows the shape of complex wire spring structures when under load by persons resting their backs on the complex wire spring structures.
Figure 59:
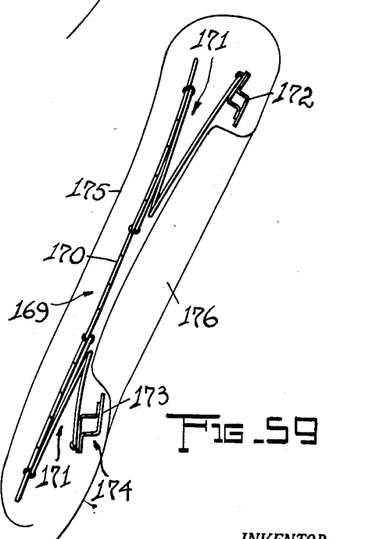
Fig. 59 shows the shape of loaded complex wire spring structures when subjected to shock loads.

The front seat back construction 169 illustrated in Figs. 56 through 59 discloses in Fig. 56 a cross sectional view through a front seat back construction before upholstery which embodies a plurality of complex wire spring structures 170 having its accordion-fold wire supporting members 171 mounted on top and bottom rails 172, 173 of a frame 174 in a manner previously described. Front seat back construction 169 is shown in Fig. 57 in a partly compressed condition by cover member 175 which is tightly stretched over the construction. Under normal load conditions the front seat back construction 169 will be compressed as shown in Fig. 58, and under shock load conditions the front seat back construction will be compressed as shown in Fig. 59. The shape of the front seat back construction 169 under normal and shock loads leaves within the confines of frame 174 an area 176 which is available for additional passenger knee room in the rear seating compartment of motor vehicles.

Figures 60, 61, 62, 63:
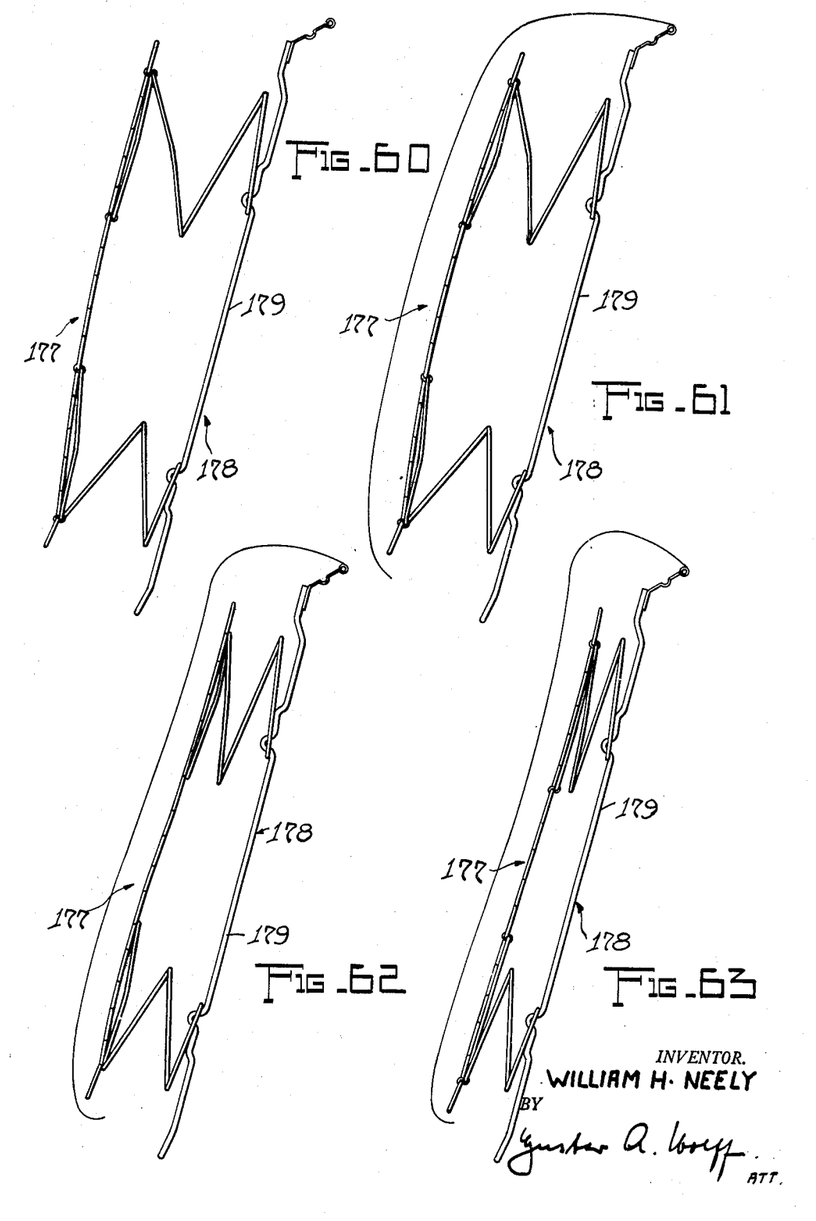
Fig. 60 shows the shape of complex wire spring structures mounted on a frame.
Fig. 61 shows the shape of upholstered and partly tensioned complex wire spring structures.
Fig. 62 shows the shape of loaded complex wire spring structures when under load by persons resting their backs on the complex wire spring structures.
Fig. 63 shows the shape of loaded complex wire spring structures when subjected to shock loads.

The rear seat back construction 177 illustrated in Figs. 60 through 63 discloses in Fig. 60 a cross sectional view through a rear seat back construction before upholstery which embodies a wire frame 178 with specially constructed wire stringers 179 mounting accordion-fold wire supporting members 180 of a complex wire spring structure 181. Action and reaction of rear seat back construction 177 is similar to the action and reaction of front seat back construction 169 previously described, therefore closer scrutiny is deemed superfluous.

Having thus described my invention, what I claim is:

1. In a wire spring structure, a frame, axially aligned oppositely disposed pairs of longitudinaly spaced accordion-fold wire members, each of said accordion-fold wire members including laterally spaced accordion-fold wire supporting elements and means therebetween supporting the same in cantilever relationship from said frame, and two zigzag wire strips for each aligned pair of longitudinally spaced accordion-fold wire members, each zigzag strip being supported on two axially aligned accordion-fold wire supporting elements in spaced relationship to said frame and the adjacent zigzag strip.

2. In a wire spring structure, a support, longitudinally spaced axially aligned accordion-fold spring members each comprising a single anchor portion adapted to mount the accordion-fold spring member on said support in cantilever relation with respect thereto and a pair of laterally spaced individual accordion-fold elements, each accordion-fold element including a substantially straight supporting arm disposed in spaced relationship above said support, said supporting arms having at opposite ends transverse elements, and elongated zigzag spring strip means each supported at longitudinally spaced points therealong on said transverse elements of said supporting arms.

3. In a wire spring structure, a frame with longitudinal spring supporting frame elements, pairs of axially aligned longitudinally spaced accordion-fold wire members supported by said frame elements in cantilever relationship with respect thereto, each accordion-fold wire member including a plurality of generally longitudinal angularly related arms and transverse elements at the ends of said arms, and laterally spaced zigzag wire spring strips having spaced cross members, said wire springs supported by some of their cross members on the transverse elements of the outermost arms of said axially aligned pairs of longitudinally spaced accordion-fold wire members.

4. In a spring structure, a frame having spring anchoring formations therein, axially aligned longitudinally spaced accordion-fold wire supporting members each including two laterally spaced individual accordion-fold wire supporting elements and a single anchor formation interlocked with one of the anchoring formations of said frame arranged to support the accordion-fold wire supporting member in cantilever relationship to said frame, each accordion-fold wire supporting element including an outer elongated substantially straight wire arm having spaced transverse spring strip supporting elements and zigzag wire spring strips mounted on said spring strip supporting elements.

5. A wire spring structure as described in claim 4, wherein said zigzag wire strips embody left and right-handed loops successively connected by wire cross members and wherein the wire cross members located in the end sections of the wire strips are spaced from each other a distance different from the spacing of the cross members in the central area of the wire strips.

6. In a spring structure, an accordion-fold wire supporting member and zigzag resting elements provided with transverse members supported by said accordion-fold wire supporting member, said accordion-fold wire supporting member comprising an anchor portion adapted to engage a frame member and hold said accordion-fold member in cantilever relationship in respect to said frame and a pair of laterally spaced parallelly arranged accordion-fold elements extending from said anchor portion, each accordion-fold element including a longitudinal arm and transverse members, said arm spacing its transverse members to coincide with and support transverse members of the zigzag resting element supported thereby.

7. In a spring structure, an accordion-fold wire supporting member and zigzag resting elements supported thereby having transverse members, said accordion-fold wire spring supporting member comprising an anchor portion adapted to engage a frame member and hold said accordion-fold member in cantilever relationship in respect thereto and a pair of laterally spaced accordion-fold elements extending from said anchor portion, each accordion-fold element including an outer longitudinal supporting arm having transverse members at its ends, the transverse members on said supporting arms being spaced to coincide with and support some of the transverse members of the zigzag resting elements, said outer longitudinal supporting arms of the accordion-fold elements being bent away from the zigzag resting elements to prevent said zigzag resting elements from contacting portions of the supporting arms when said zigzag elements are under load.

8. In an accordion-fold wire spring member, a pair of compressible wire spring elements of accordion-fold shape, each wire spring element including a plurality of short wire cross members at least two of which are located at one end of the element in superimposed spaced relationship with respect to each other, longitudinal relatively long straight wire levers sequentially connecting the cross members to each other to form the accordion-fold shape of the wire spring element, one straight wire lever of each wire spring element extending therefrom converging toward the corresponding straight wire lever of the other spring element, and coupling means connecting the converging straight levers of said wire spring elements, corresponding wire cross members and wire levers of the pair of wire spring elements being symmetrically arranged in respect to each other, the wire levers of each wire spring element being inclined with respect to each other, and the outermost of the relatively long wire levers of each wire spring element including a bent portion arranged between the ends of the said outermost long wire levers.

9. An accordion-fold wire spring member as described in claim 8, wherein at least one of the relatively long wire levers of each wire spring element connects diagonally opposed ends of sequential wire cross members.

10. An accordion-fold wire spring member as described in claim 8, wherein at least one of the relatively long wire levers of each wire spring element has an overall length different from the overall length of the other relatively long straight wire levers thereof.

11. In a wire spring structure, a frame, axially aligned longitudinally spaced accordion-fold wire members supported by said frame in cantilever-like fashion and zigzag wire strips supported by said accordion-fold wire members, each accordion-fold wire member including a pair of accordion-fold elements having relatively non-extensible supporting arms arranged below said zigzag wire strips, said supporting arms having their free ends extended toward the middle portion of such wire strips and including spaced transverse end members arranged to engage spaced cross members of said zigzag wire strip, said transverse end members attached to such cross members to support said zigzag wire strips by said supporting arms in areas near the ends of the wire strips and areas spaced from said ends.

References Cited in the file of this patent

UNITED STATES PATENTS

| | | |
|---|---|---|
| 1,476,046 | Brandel et al. | Dec. 4, 1923 |
| 2,311,145 | Widman | Feb. 16, 1943 |
| 2,356,417 | Mayer | Aug. 22, 1944 |
| 2,643,705 | Neely | June 30, 1953 |
| 2,669,293 | Neely et al. | Feb. 16, 1954 |
| 2,684,844 | Flint et al. | July 27, 1954 |